O. JAEGER.
VENDING MACHINE.
APPLICATION FILED SEPT. 22, 1917.

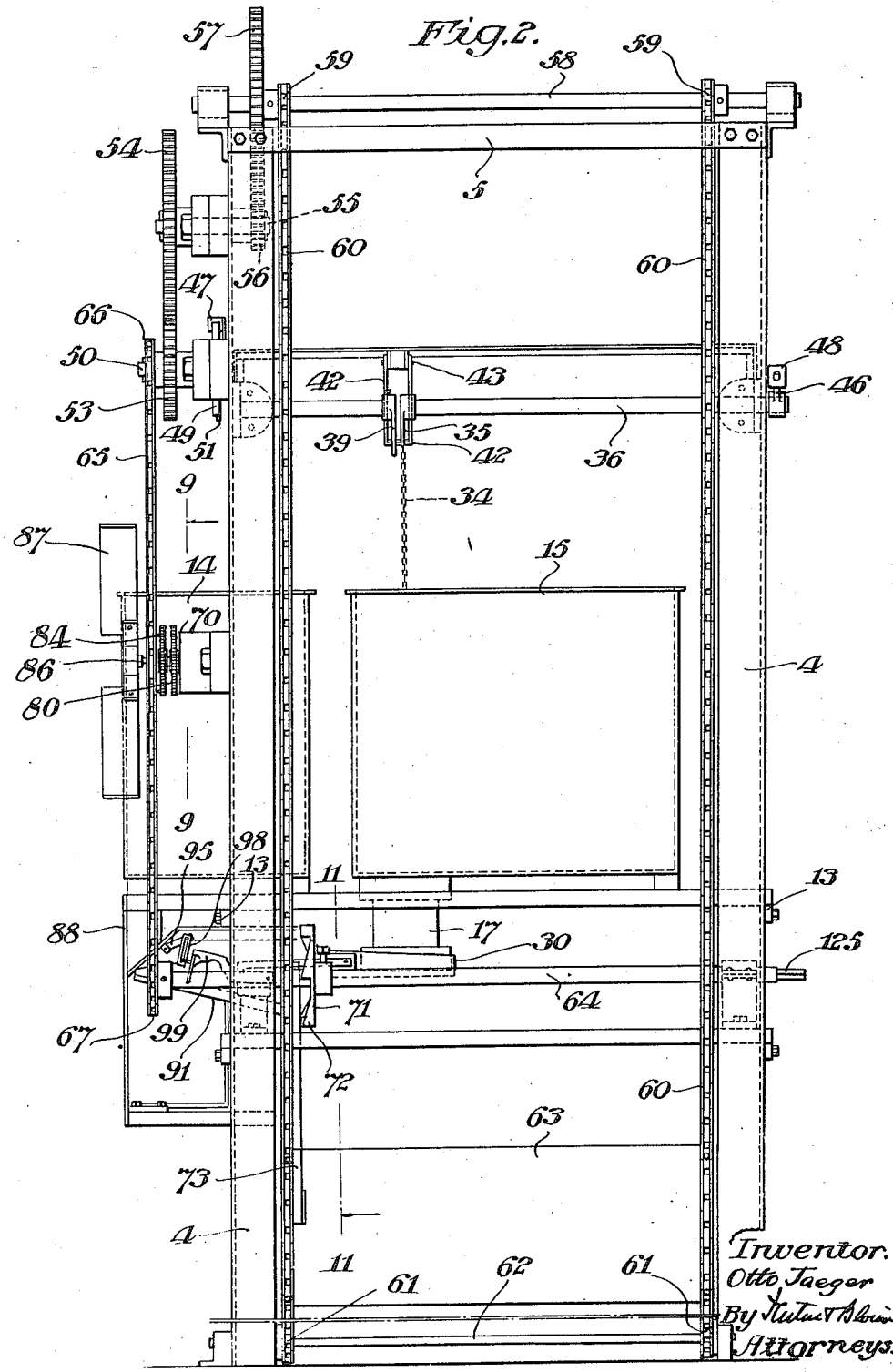

1,322,449.

Patented Nov. 18, 1919.
8 SHEETS—SHEET 3.

Inventor:
Otto Jaeger
By Hulout Blount
Attorneys.

O. JAEGER.
VENDING MACHINE.
APPLICATION FILED SEPT. 22, 1917.

1,322,449.

Patented Nov. 18, 1919.
8 SHEETS—SHEET 4.

WITNESS
F. J. Hartman,

INVENTOR
Otto Jaeger,
BY Hilton & Blount
ATTORNEY

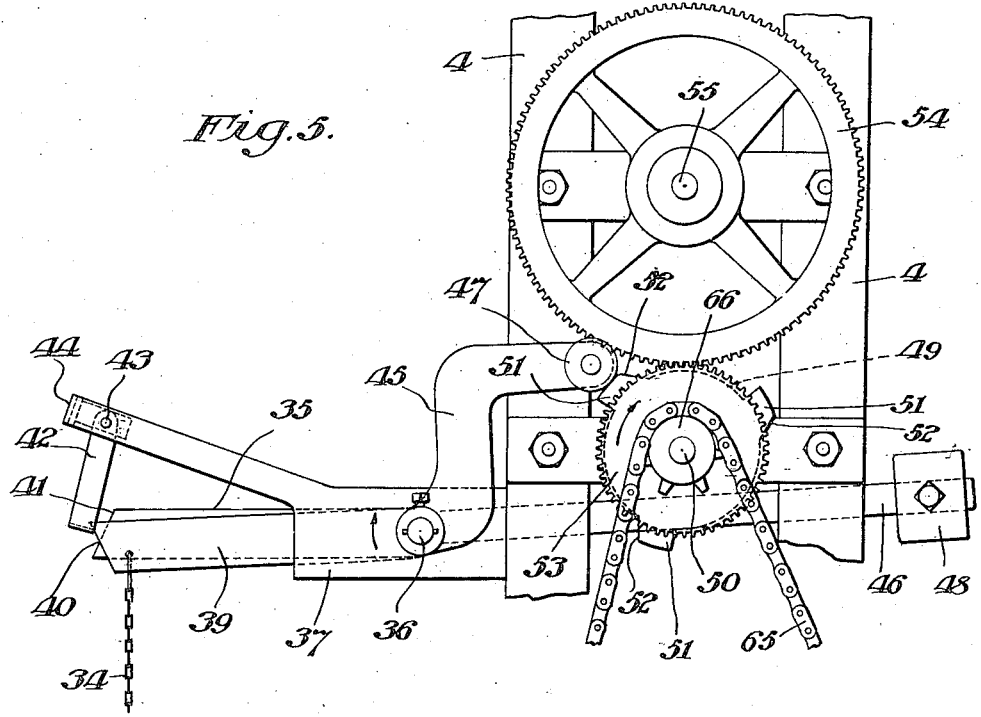
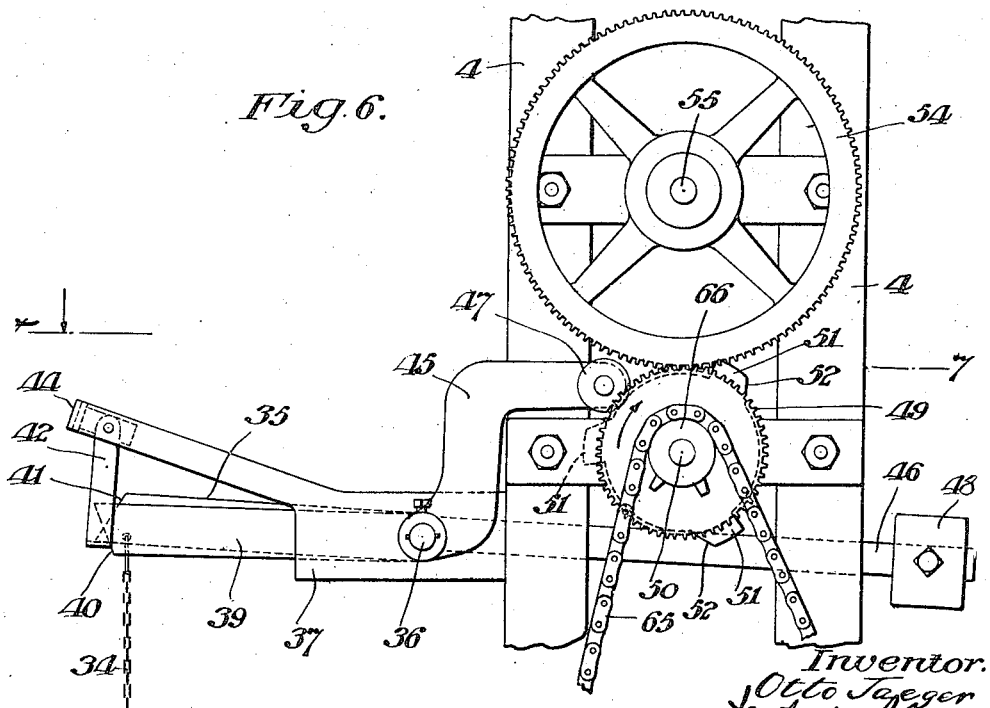

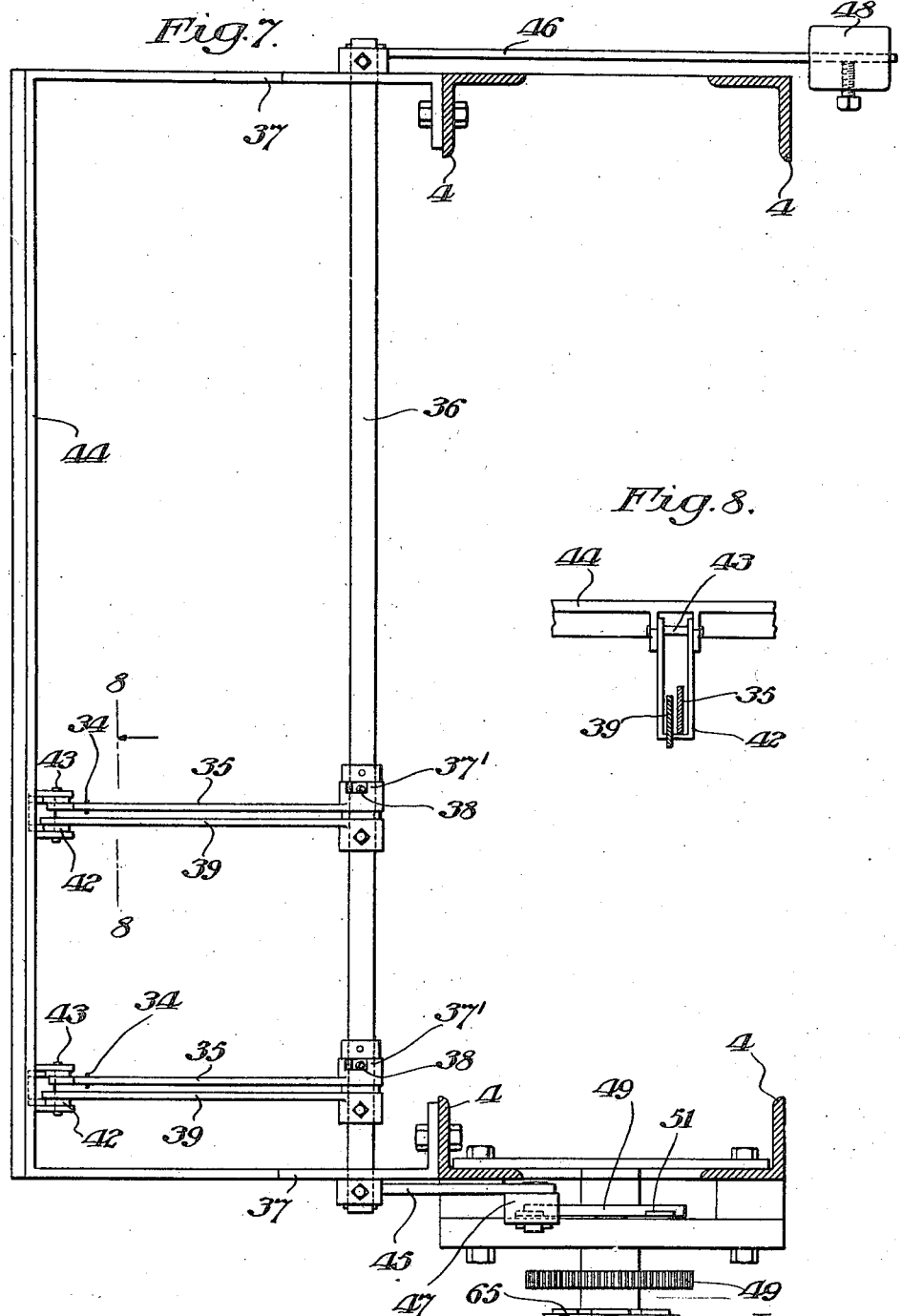

O. JAEGER.
VENDING MACHINE.
APPLICATION FILED SEPT. 22, 1917.

1,322,449.

Patented Nov. 18, 1919.
8 SHEETS—SHEET 7.

Inventor:
Otto Jaeger
By Fulton & Blount
Attorneys.

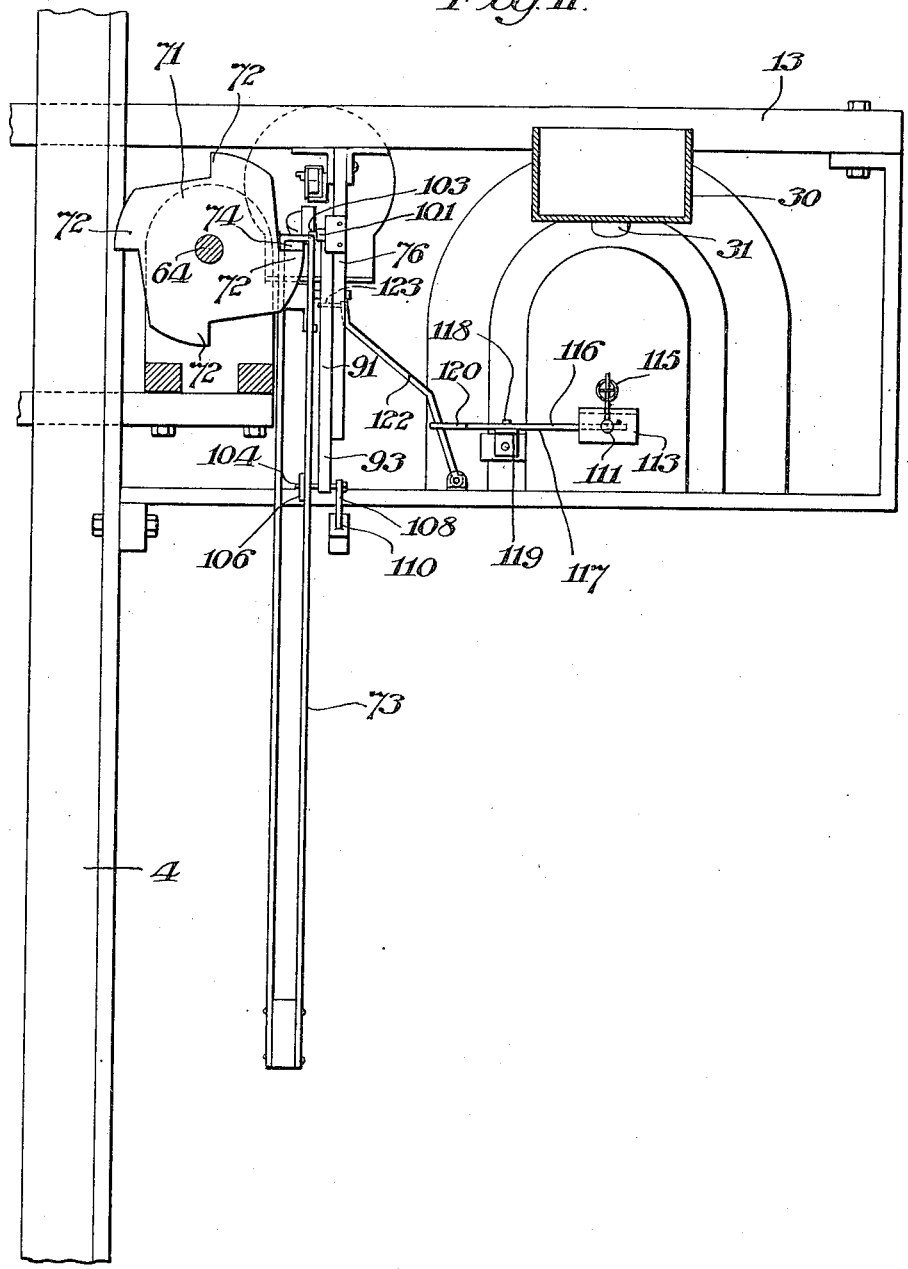

UNITED STATES PATENT OFFICE.

OTTO JAEGER, OF ELKINS PARK, PENNSYLVANIA, ASSIGNOR TO HARRY S. KELSEY, OF BOSTON, MASSACHUSETTS.

VENDING-MACHINE.

1,322,449. Specification of Letters Patent. Patented Nov. 18, 1919.

Application filed September 22, 1917. Serial No. 192,666.

*To all whom it may concern:*

Be it known that I, OTTO JAEGER, a citizen of the United States, residing at Elkins Park, in the county of Montgomery, State of Pennsylvania, have invented a certain new and useful Improvement in Vending-Machines, of which the following is a specification, reference being had to the accompanying drawing, forming a part thereof.

My invention relates to improvements in vending machines particularly adapted to vend coffee and other liquid commodities.

The principal objects of the invention are to provide a novel and efficient dispensing mechanism wherein the liquid commodity may be discharged from a storage vessel into and from a measuring vessel in predetermined and measured quantities, and to provide a controlled mechanism for operating such dispensing mechanism wherein the valvular devices governing the measuring mechanism may be operated with precision, both as to the reception of the liquid commodity within the measuring chamber and its discharge therefrom, and wherein the mechanism provided therefor operates to automatically render inactive the said valvular-devices after each cycle of actuation thereof to fill and discharge the measuring chamber, and finally wherein controller devices, which may be manually operated, are provided to throw into operation said devices effecting the actuation of said valvular devices.

With the above and related objects in view, my invented machine consists of the elements and combinations of them hereinafter described and claimed.

In the accompanying drawings, illustrating my invention:

Figure 1 is a front elevation, partly broken away, of a vending machine embodying my invention.

Fig. 2 is a side elevation thereof.

Figs. 5 and 6 are enlarged front views of a portion of the valve operating mechanism showing the parts in different positions.

Fig. 7 is a horizontal section on line 7—7 of Fig. 6.

Fig. 8 is a sectional detail, on line 8—8 of Fig. 7.

Fig. 11 is a section on line 11—11 of Fig. 2.

Figure 3:
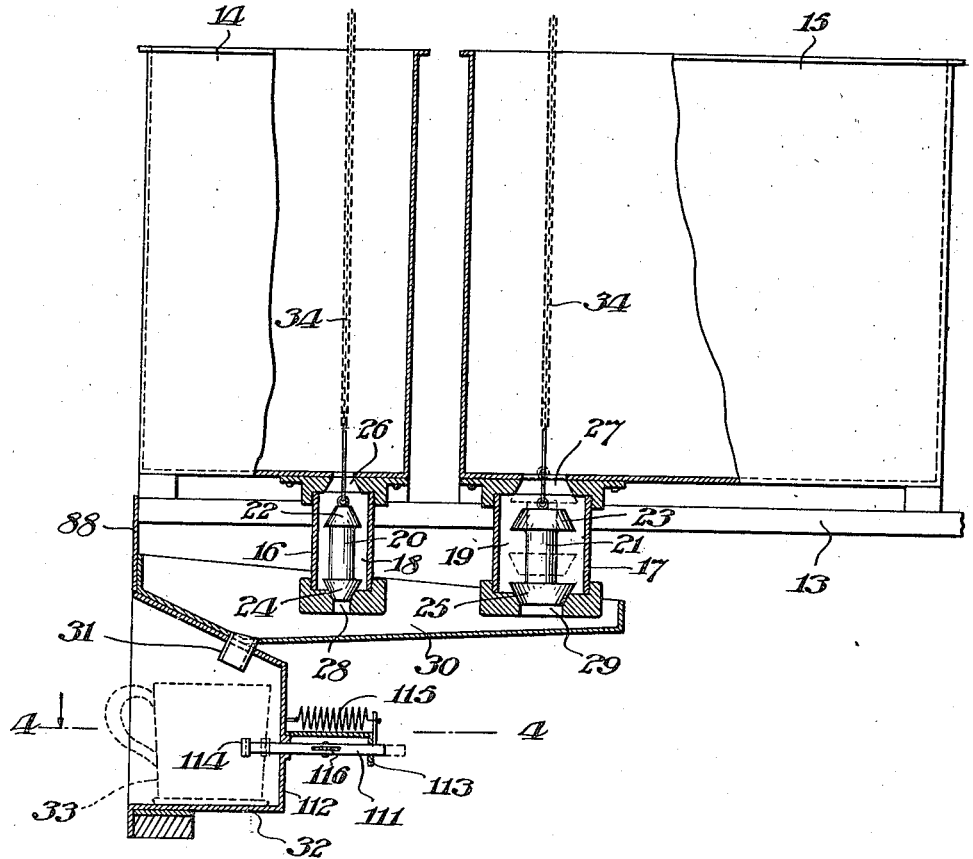
Fig. 3 is a vertical section through the liquid dispensing vessels and adjuncts, on line 3—3 of Fig. 1.

The frame structure of the machine comprises base bars 2, standards 4 secured to and rising from the bars 2, and bars 5 connecting the standards 4.

Supported on horizontal bars 13 which are secured to and project from the standards 4 are two storage vessels 14 and 15 adapted to contain liquid commodities such as cream and coffee, respectively.

The bottoms of the vessels 14 and 15 are provided with downwardly extending measuring vessels 16 and 17 which inclose measuring chambers 18 and 19, respectively. Within the chambers 18 and 19 are vertically movable valve members 20 and 21 having valves 22 and 23 formed on their upper ends and valves 24 and 25 formed on their lower ends, respectively. Each valve member consists of two valves connected and carried in a manner to operate them for the performance of their respective functions simultaneously and by a single movement of the valve member in each direction. The valves 22 and 23 are adapted to seat against the walls of passages 26 and 27 formed in the tops of the measuring vessels 16 and 17 to afford communication between the storage vessels 14 and 15 and the measuring chambers 18 and 19, respectively; and the valves 24 and 25 are adapted to seat against the walls of passages 28 and 29 formed in the bottoms of the vessels 16 and 17, respectively, to permit the contents of the chambers 18 and 19 to be discharged therefrom.

By mechanism hereinafter described, the valve members 20 and 21 are adapted to be quickly raised from the normal position shown, to close the passages 26 and 27 and by the same movement to open the passages 28 and 29 to discharge the contents of the chambers 18 and 19 and thereafter by a single reverse movement to permit them to be refilled from the vessels 14 and 15.

normal position shown in Fig. 5 to the position shown in Fig. 6. During this movement of the arms 35 and 39, the beveled ends 41 of the arms 35 move the lower ends of the links 42 outwardly until the bottoms of the free ends of the arms 35 are raised above the bottoms of the links 42 and the bottoms of the links 42 pass by gravity beneath the ends of the arms 35 and rest against the beveled ends 40 of the arms 39, as shown in Fig. 6. The parts remain in this position until the next succeeding tooth 51 reaches the roller 47, and, during this time, the liquid is discharged from the chambers 18 and 19. As the said next succeeding tooth 51 comes into registry with the roller 47, the inclined face 52 of the tooth raises the roller 47, and the wheel 49 is stopped with the roller 47 resting against the outer face of the tooth 51. When the inclined face 52 of the tooth 51 raises the roller 47, as just described, it moves the arm 45 to turn the shaft 36 and thereby raise the weighted arm 46 and lower the arms 39 from the position shown in Fig. 6 to the position shown in Fig. 5. As the arms 39 are thus lowered, the links 42 hold the arms 35 in the position shown in Fig. 6 and thereby hold the valves 22 and 23 closed, while the pins 38 move away from the shoulders 37'; and, just before the arms 39 reach the position shown in Fig. 5, the beveled ends thereof engage the links 42 and move them outwardly from beneath the ends of the arms 35, freeing them and permitting them and the valve members 20 and 21 to drop instantly to the position shown in Figs. 3 and 5 and thereby quickly close the valves 24 and 25 and open the valves 22 and 23, leaving the parts in the position shown in Figs. 3 and 5 for a succeeding operation. It will thus be seen that each time the wheel 49 is turned to move a tooth 51 from the roller 47 and bring the next tooth 51 from the roller 47 and bring the next tooth 51 into registry therewith, the liquid chambers 18 and 19 will be discharged and refilled.

I shall now describe the means for turning the wheel 49. The shaft 50 is provided with a pinion 53 in mesh with a gear wheel 54 on a shaft 55 which is journaled in suitable bearings on the machine frame. The shaft 55 carries a pinion 56 which is in mesh with a gear wheel 57 on a shaft 58 which turns in bearings on the upper portion of the machine frame. The shaft 58 is provided with a pair of sprocket wheels 59 over which the upper ends of a pair of vertically-disposed sprocket chains 60 pass and with which they are engaged. The lower ends of the chains 60 pass beneath and are engaged with a pair of sprocket wheels 61 on a shaft 62 which extends parallel to the shaft 58 and turns in bearings on the lower portion of the machine frame. The sprocket chains 60 carry a weight 63 which extends between opposite sides thereof and which is secured thereto. The weight 63 tends to turn the sprocket wheels 59 and shaft 58 in the direction of the arrow in Fig. 1, thereby tending, through the gear wheels 57 and 54 and the pinions 56 and 53 to turn the shaft 50 and cam wheel 49 in the direction of the arrow, for the purpose herebefore described.

The turning of the cam wheel 49 by the weight 63 is governed by a controlling shaft 64 which turns in bearings on the machine frame and which is connected to the shaft 50 of the cam wheel 49 by a sprocket chain 65 which passes around and is engaged with sprocket wheels 66 and 67 on the shafts 50 and 64 respectively, and which also passes around and is engaged with a sprocket wheel 68 on a shaft 69 which turns in a bracket 70 on the machine frame and which will be referred to later.

The power of the weight 63, in tending to turn the cam wheel 49 in the direction of the arrow, also tends to turn the controlling shaft 64 in the direction of the arrow, and the shaft 64 is normally prevented from being thus turned by a ratchet wheel 71 having laterally extending teeth 72, and a member 73 having an arm 74 which is engaged with one of the ratchet teeth 72. The member 73 is pivoted at 75, to a bracket 76 on the machine frame, and the arm 74 of the member 73 is pivoted thereto, and held normally against a stop wall 76' thereon by the action of a spring 77, one end of which is attached to the member 73 and the other end of which is attached to the arm 74. The purpose of pivoting the arm 74 to the member 73 will be hereinafter described. Normally, the arm 74 is engaged by a ratchet tooth 72 and is held against the stop wall 76' and thereby prevents the turning of the shaft 64 by the weight 63, and the location of the pivot 75 of the member 73 with relation to the point of engagement of the arm 74 with the ratchet tooth 72 is such that the pressure of the tooth 72 against the arm 74 tends to move the arm 74 and member 73 from a position to thereby release the ratchet wheel 71 from the arm 74 and permit the controlling shaft 64 and the cam wheel 49 to be turned by the weight 63, and thereafter permit the member 73 to return by gravity to the original position. The member 73 is held normally in the initial position shown in Fig. 12 by certain devices which will be presently described, and which are operative to release the member 73 and to reëngage the same and again hold it in the position when it returns thereto by gravity. When the member 73 is released, the weight 63 is thereby permitted to turn the ratchet wheel 71 which, acting against the arm 74, moves the member 73 to a position in which the ratchet tooth 72 engaged with the arm 74 escapes the same, and, thereafter, the end of the arm 74 bears against the side of the ratchet tooth 72, as the member 73 tends by gravity to resume its initial position. The sides of the teeth 72 are beveled or inclined, as shown to permit the arm 74 and member 73 to return to its initial position, after the member 73 is operated to release each ratchet tooth 72 and before the next succeeding tooth 72 reaches the arm 74 to engage the same and prevent the further turning of the controlling shaft 64 and also the further turning of the cam wheel 49. The gearing between the controlling shaft 64 and the cam wheel 49 is such that each time the member 73 is operated to release the ratchet wheel 71 and permit it to turn a distance equal to the distance between two of its teeth 72, as just described, the weight 63 will be permitted to turn the cam wheel 49 a distance equal to the distance between two of its teeth 51, for a liquid dispensing operation, as hereinbefore described.

To prevent the weight 63 from turning the cam wheel 49 too rapidly during each dispensing operation, I provide a retarding means or governor, as follows: The shaft 69, hereinbefore referred to, has a ratchet wheel 78 secured thereon which engages a pawl 79 carried by a gear wheel 80 which is loosely mounted on the shaft 69, the pawl 79 being pressed against the ratchet wheel 78 by a spring 81 carried by the wheel 80. The ratchet wheel 78 causes the gear wheel 80 to turn with the shaft when the shaft 69 is turned in the direction of the arrow under the influence of the weight 63; and the pawl 79 permits the shaft 69 to be turned in the reverse direction independently of the wheel 80, for a purpose hereinafter explained. The gear wheel 80 is in mesh with a pinion 82 on a shaft 83 which turns in the bracket 70 and which carries a gear wheel 84. The gear wheel 84 is in mesh with a pinion 85 on a shaft 86 which turns in the bracket 70 and which has an outwardly projecting end carrying a fan 87, the rotation of which is resisted by the surrounding air. It will thus be seen that the fan 87 and the gearing between it and the sprocket wheel 68 will regulate and control the speed at which the weight 63 is permitted to turn the cam wheel 49.

The member 73 hereinbefore referred to is preferably controlled and operated by proper checks or coins inserted into the machine for the purpose of operating the liquid dispensing devices, for a description of which, I refer to my divisional application for patent therefor, filed December 17, 1918, Ser. No. 267,100.

Means which may be employed to control, manually if desired, the operation of the lever member 73, consists of an arm 101, operating as a latch device, which is pivoted at 102 to an extension on the bracket 76, and is adapted to be raised on its pivotal bearing, manually if desired, by its free end. The arm 101 is provided with a lateral projection 103 which is adapted to be engaged by the upper end of the member 73 and prevent the movement thereof by the ratchet wheel 71, as previously described, when the arm 101 is in the normal position shown in Fig. 12. When the arm 101 is raised on its pivotal bearing as aforesaid, the projection 103 escapes the upper end of the member 73 and releases the same.

Figure 12:
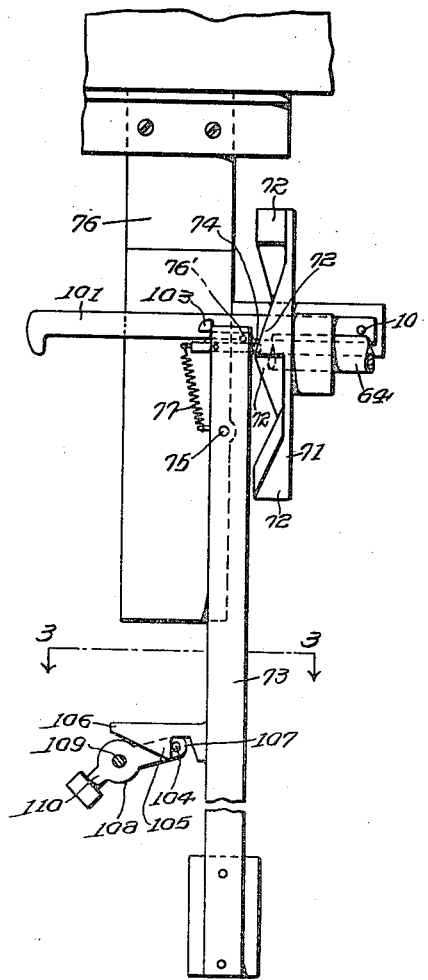
Figs. 12 and 13 are side elevations in its two positions of a part of the controlling mechanism shown in Figs. 2 and 11.
Figure 13:
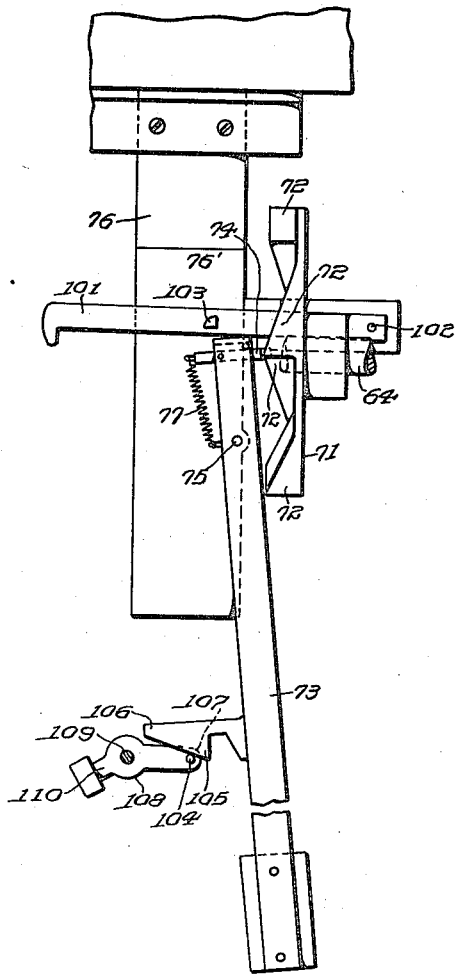
Figure 4:
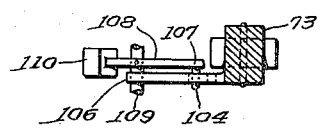
Fig. 4 is a sectional plan of the latch device, on the line 3—3 of Fig. 12.
Figure 9:
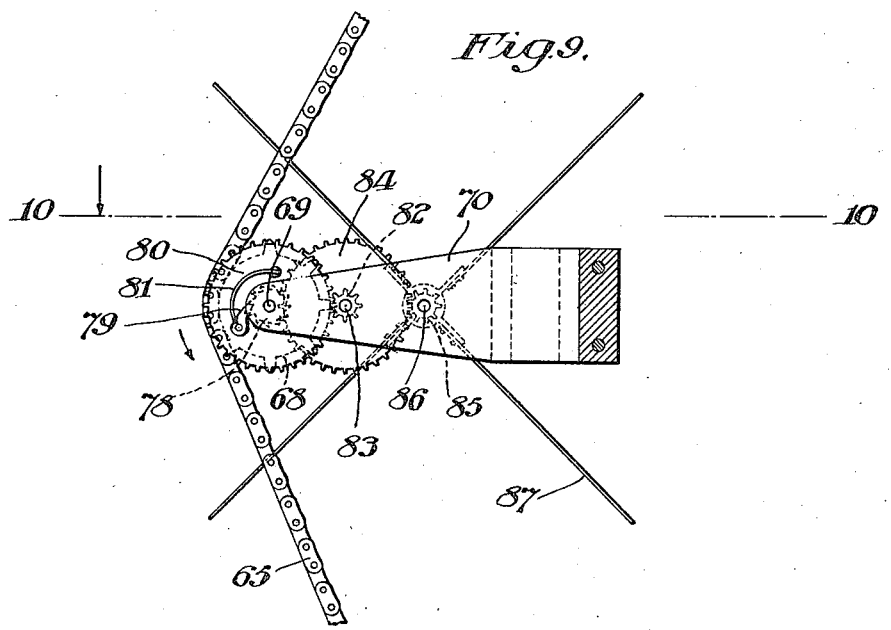
Fig. 9 is a section on line 9—9 of Fig. 2, showing the speed governor.
Figure 10:
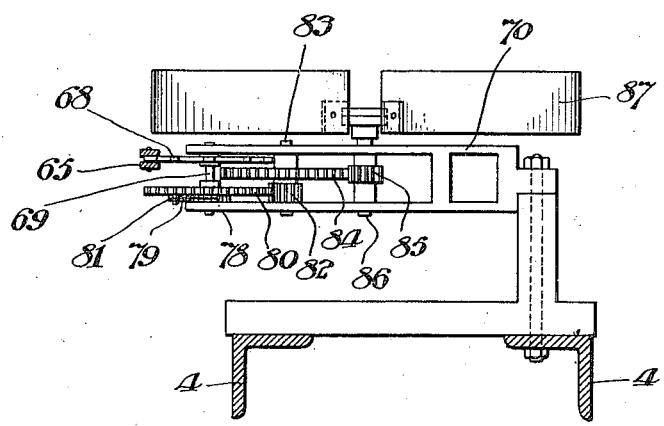
Fig. 10 is a sectional detail of the speed governor, on line 10—10 of Fig. 9.

When member 73 is thus released by the projection 103 the pressure of the ratchet wheel 71 against the arm 74 moves the member 73 from its initial position shown in Fig. 12 to the position shown in Fig. 13, and the projection 103 rests upon the member 73 and supports the arm 101 in its initial position. Before member 73 fully reaches the position shown in Fig. 13, the arm 74 escapes the tooth 72 of the ratchet wheel 71 with which it is engaged, and the further movement of the member 73 is prevented by a restraining pin 104 which is engaged by a tooth 105 on an arm 106 which projects from the member 73. The pin 104 is carried by one arm 107 on a balanced lever 108, the other arm 110 of which is weighted to maintain the lever 108 normally in the position shown in Fig. 12.

The pin 104 is operable by hand, if desired, to move it downwardly from the tooth 105. When the tooth 105 is thus released, the pressure of the ratchet wheel 71 moves the member 73 to the position shown by full lines in Fig. 12 and the ratchet tooth 72 engaged with the arm 74 escapes the same and permits the ratchet wheel 71 to turn under the influence of the weight 63 as previously described. This done, the end of the arm 74 bears against the side of the ratchet tooth 72, and the member 73 tends to return by gravity to its initial position shown in Fig. 12, while the pin 104 rests against the inclined bottom of the tooth 105 as the lever 110 tends to return it to its normal position shown in Fig. 12. When the member 73 thus returns to the normal position, the pin 104 escapes from engagement with the bottom of the tooth 105 and returns to its normal position shown in Fig. 12, and the upper end of the member 73 moves from beneath the projection 103 and permits the arm 101 to fall by gravity to its normal position shown in Fig. 12 and again lock the member 73 against movement by the ratchet wheel 71, before the next succeeding ratchet tooth 72 reaches the arm 74 so that when the said next succeeding tooth 72 reaches and engages the arm 74 it will stop further movement of the ratchet wheel 71 and controlling shaft 64 until the member 73 is again released from the arms 101 and 107. It will thus be seen that each time the controlling member 73 is so operated the valve actuating devices will be operated to fill and empty the measuring vessel as before described.

In order to prevent the discharge of coffee from the spout 31 before a cup has been placed upon the shelf 32 to receive it, I provide the following: Extending rearwardly from the position occupied by a cup 33 when placed upon the shelf 32 is a rod 111 which is mounted to slide in a wall 112, rising from the back of the shelf 32, and in a bracket 113 secured to the back of the wall 112. The forward end of the rod 111 is provided with an abutment plate 114 adapted to be engaged by a cup 33; and the rod 111 is held normally in the full line position shown in Fig. 3 by a spring 115 one end of which is attached to the wall 112 and the other end of which is attached to a pin 116 extending from the rod 111. When a cup 33 is placed upon the shelf 32 beneath the spout 31 in the position shown by dotted lines in Fig. 3, the rod 111 is thereby pushed back against the action of the spring 115 to the position shown by dotted lines: and when the cup 33 is moved from the shelf 32, the spring 115 returns the rod 111 to the normal or full line position.

To raise the weight 63 after it has been lowered in operating the machine, I provide the controlling shaft 64 with an outwardly extending square end 125 for the reception of a suitable hand crank by means of which the shaft 64 may be turned. When it is desired to raise the weight 63, the crank is applied to the shaft 64 and it is turned in the direction of the dotted line arrow in Fig. 1, while the arm 45 and roller 47 are held raised by hand to maintain them out of engagement with the cam wheel 49. This turning of the shaft 64 operates the gearing between it and the chains 60 to raise the weight 63; and, during this operation, the pivoted arm 74 of the member 73 springs past the teeth 72 of the ratchet wheel 71 without moving the member 73, and the pawl 79 permits the sprocket wheel 68 to turn independently of the gearing between it and the fan 87 which controls the speed of the downward movement of the weight 63 when it operates the machine.

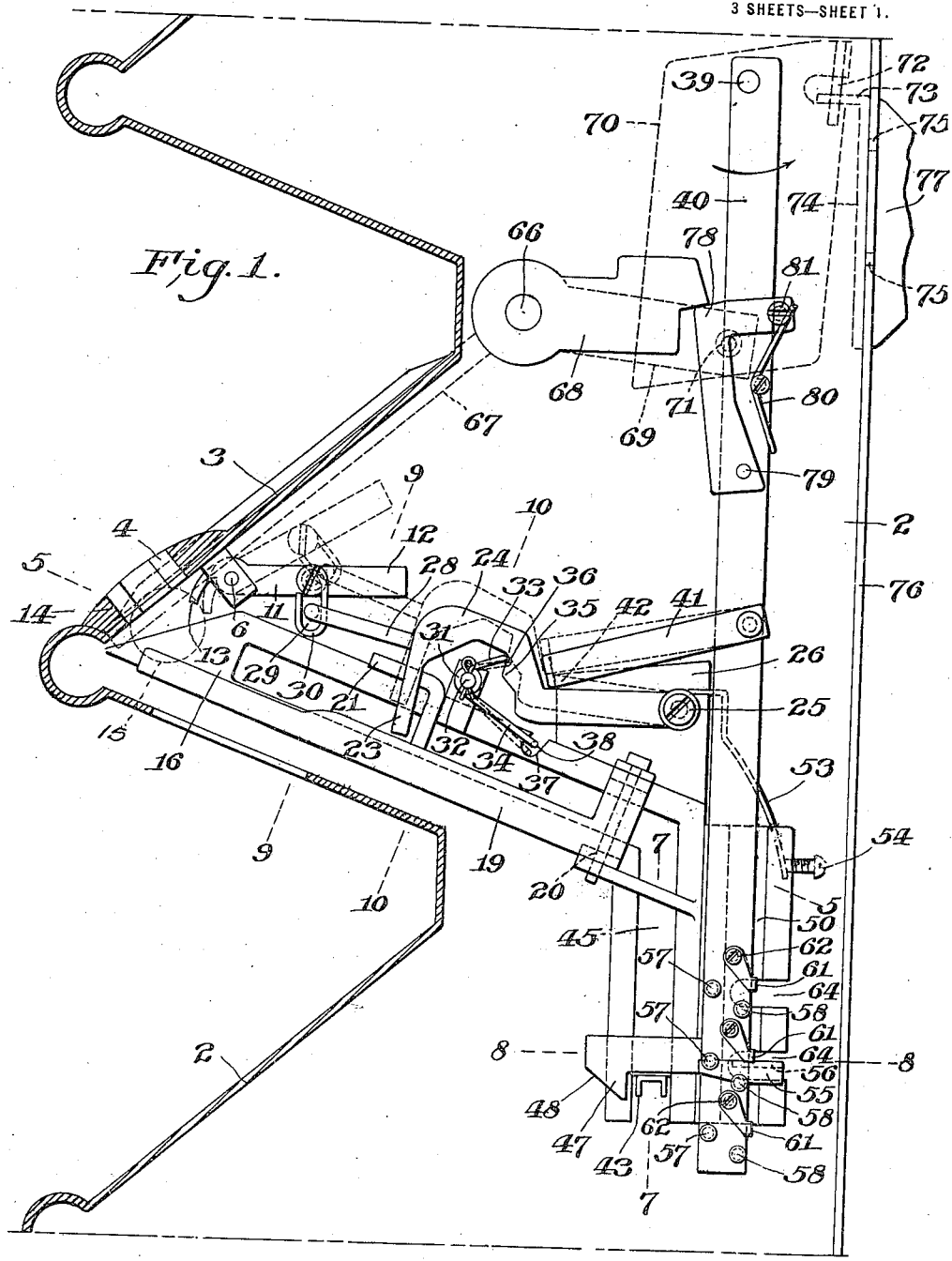

I claim:

1. In a vending machine, a storage vessel to contain the commodity to be vended, a measuring vessel having an inlet passage communicating therewith and a discharge passage, a pair of connected valves, operably movable as one to open and close said passages in alternating succession, a pivoted arm and a connected vertically reciprocative member supporting said valves dependingly to permit their operation by gravity to open said inlet passage and fill said measuring chamber, and mechanism to raise said pivoted arm and operate said valve-supporting member in the opposite direction to discharge the measured contents thereof, means to engage and hold said pivoted arm in raised position to effect said discharge and operable to release the same to permit said valvular device and adjunctive elements to thereafter return by gravity to normal position, said means including a rockable shaft on which said arm is mounted, means to rock said shaft in one direction to raise said arm, and means to rock it in the reverse direction to release said arm and permit it to return to initial lowered position.

2. In a vending machine, a vessel to contain the commodity to be vended and a measuring vessel having a normally open inlet passage communicating with said vessel and a discharge passage, valvular means constructed and operable to both close and open said inlet and discharge passages respectively, in alternating succession, a vertically movable member dependingly carrying said valvular means, a pivoted arm connected to said member, and mechanism operable to raise said arm and thereby raise said valvular device to discharge the measured commodity through said measuring vessel, means to hold said last mentioned element in raised position pending said discharge and operable thereafter to release said arm and permit said valvular device and adjunctive elements to return to normal position by gravity, said mechanism comprising essentially a rockable shaft on which said pivoted arm is mounted, means to rock said shaft in one direction to raise said arm, means to rock it in the reverse direction to permit said arm to return to normal lowered position and actuating means therefor including a rotatable shaft, means tending to rotate it, and means to hold said shaft against rotation and operative to release the same, the last named means, after being operated to release said shaft, acting automatically to stop the rotation thereof after each cycle of movement of said valvular device to discharge and refill said measuring vessel.

3. In a vending machine, a storage vessel for the commodity to be vended, a measuring vessel having a passage communicating with the storage vessel to receive and measure a predetermined quantity of said commodity, said measuring vessel having a discharge passage, a vertically movable member, a valve operated by said member when it is raised and lowered to close and open the first named passage, a valve operated by said member when it is raised and lowered to open and close the second named passage, a pivoted arm connected to said member, means operative to raise said arm and thereby raise said member, a holding device to engage and hold said arm in its raised position, and means to operate said holding device to release said arm and permit it and said member to be lowered by gravity.

4. In a vending machine, a storage vessel for the commodity to be vended, a measuring vessel having a passage, communicating with the storage vessel to receive and measure a predetermined quantity of said commodity, said measuring vessel having a discharge passage, a vertically movable member, a valve operated by said member when it is raised and lowered to close and open the first named passage, a valve operated by said member when it is raised and lowered to open and close the second named passage, a pivoted arm connected to said member and adapted to raise it when said arm is raised, a holding device to engage and hold said arm in its raised position, a rockable shaft, means operative to rock said shaft, means operated by said shaft to raise said arm, and means operated by said shaft to operate said holding device to release said arm and permit it and said member to be lowered by gravity.

5. In a vending machine, a storage vessel for the commodity to be vended, a measuring vessel having a passage communicating with the storage vessel to receive and measure a predetermined quantity of said commodity, said measuring vessel having a discharge passage, a vertically movable member, a valvular device carried thereby and operable to open and close both of said passages in alternating succession, a pivoted arm carrying said member, said means comprising a rockable shaft, a weighted arm thereon operating when released to rock said pivoted arm in a direction to raise said member, a cam mechanism, means to support and actuate it, and a roller device journaled on said rockable shaft and adapted to be engaged by said cam to release said weighted arm, means operated by said cam to rock said shaft in the reverse direction and then release it, means operated by said shaft, when rocked by said weighted arm, to raise said pivoted arm, a holding device to engage and hold said arm in its raised position, and means operated by said shaft when rocked in said reverse direction to operate said holding device to release said pivoted arm and permit it and said valve carrying member to return by gravity to initial lower position.

6. In a vending machine, a storage vessel for the commodity to be vended, a measuring vessel having a passage communicating with the storage vessel to receive and measure a predetermined quantity of said commodity, said measuring vessel having a discharge passage, a vertically movable member, a valve operated by said member when it is raised and lowered to close and open the first named passage, a valve operated by said member when it is raised and lowered to open and close the second named passage, a rockable shaft, a weighted arm projecting from said shaft and tending to rock it in one direction, means operative to rock said shaft in the reverse direction and then release the same to permit it to be rocked by said arm, a pivoted arm connected to said member and adapted to raise and lower the same, means operated by said shaft when rocked by said weighted arm to raise said pivoted arm, a holding device to engage and hold said pivoted arm in its raised position, and means operated by said shaft when rocked in said reversed direction to operate said device to release said pivoted arm.

7. In a vending machine, a storage vessel for the commodity to be vended, a measuring vessel having a passage communicating with the storage vessel to receive and measure a predetermined quantity of said commodity, said measuring vessel having a discharge passage, a vertically movable member, a valve operated by said member when it is raised and lowered to open and close the first named passage, a valve operated by said member when it is raised and lowered to open and close the second named passage, a rockable shaft, a weighted arm projecting from said shaft and tending to rock it in one direction, a cam, means to actuate the cam, means operated by said cam to rock said shaft in the reverse direction and then release the same to permit it to be rocked by said arm, a pivoted arm connected to said member and adapted to raise and lower the same, means operated by said shaft when rocked by said weighted arm to raise said pivoted arm, a holding device to engage and hold said pivoted arm in its raised position, and means operated by said shaft when rocked in said reverse direction to operate said device to release said pivoted arm.

8. In a vending machine, a storage vessel to contain the commodity to be vended, a measuring vessel having an inlet passage communicating with the storage vessel, and a discharge passage, a valvular device governing said passages to open and close the same respectively, means to actuate said valvular device in operatively alternating succession relatively to said passages, said means including a vertically reciprocative member, a connected pivoted arm, means to raise said arm on its pivotal bearing and thereby raise said valvular device, means to engage and hold said arm in raised position, and means to release said holding device and permit said arm to return to initial lowered position, a rotatable shaft by which said recited means are actuated, a controlling shaft, connecting actuating devices between said shafts, means tending to rotate both of said shafts, restraining means normally holding said shafts against rotation after each cycle of movement thereof and operative to release the same, a pivoted lever co-acting with said restraining means and a latch device normally engaging said lever and manually operative to release the same.

9. In a vending machine, a measuring vessel to contain the commodity to be vended and having a discharge passage, a valvular device normally closing said discharge passage, a rotatable shaft, means tending to rotate it, mechanism operated by said shaft when in motion, to raise said valvular means to effect the discharge of the commodity through said passage and thereafter release it to close said passage, and means governing the actuation of said shaft, comprising a controlling shaft, a ratchet wheel operatively connected to said last named shaft, a pivoted member normally engaging a tooth of the ratchet wheel, and a latch device holding said pivoted member in said normal position of engagement and operative to release the same to permit said ratchet to turn and its next succeeding tooth to be automatically engaged by said pivoted arm and restore said valve-actuating mechanism to initial position.

10. In a vending machine, a storage vessel having a measuring chamber, with an inlet port between them, said chamber having a discharge port, a pair of connected valves, operable to open and close said ports in alternating succession, a vertically reciprocative member carrying said valves, a pivoted arm carrying said member, a rockable shaft, means to rock said shaft in one direction to raise said arm and thereby raise said valves, means to hold said arm in raised position, means to release said holding means, means to rock said shaft in reverse direction, and means operated thereby to release said holding means, actuating devices for said recited means, comprising a rotatable shaft and a cam wheel mounted thereon, said mechanism operating automatically to stop the rotation of said last named shaft after the completion of a cycle of movement of said valves to discharge and refill said measuring vessel, and means governing the actuation of said valve-actuating means, said means including a controlling shaft connecting actuating devices between it and said rotatable shaft, a weight tending to rotate both shafts, a ratchet wheel and latch co-acting therewith, a pivoted lever and a latch device normally engaging said lever and manually operable to release the same.

In witness whereof I have hereunto set my hand this 21st day of September, A. D. 1917.

OTTO JAEGER.